United States Patent
Fu et al.

(10) Patent No.: US 6,289,746 B1
(45) Date of Patent: Sep. 18, 2001

(54) THERMAL PULSED MICRO FLOW SENSOR

(75) Inventors: Chien-Chung Fu; Cheng-Kuo Lee; Ching-Yi Wu, all of Chutung (TW)

(73) Assignee: Industrial Technology Research Institute, Chutung Hsinchu (TW)

( * ) Notice: Subject to any disclaimer, the term of this patent is extended or adjusted under 35 U.S.C. 154(b) by 0 days.

(21) Appl. No.: 09/235,162

(22) Filed: Jan. 22, 1999

(51) Int. Cl.$^7$ ................................ G01F 1/708; G01F 1/68
(52) U.S. Cl. ........................ 73/861.95; 73/204.14
(58) Field of Search ................. 73/861.95, 204.14, 73/204.15, 204.26

(56) References Cited

U.S. PATENT DOCUMENTS

| | | | |
|---|---|---|---|
| 4,782,708 | * 11/1988 | Harrington et al. | 73/204.24 |
| 4,938,079 | * 7/1990 | Goldberg | 73/861.95 |
| 5,243,858 | * 9/1993 | Erskine et al. | 73/204.26 |
| 5,533,412 | * 7/1996 | Jerman et al. | 73/861.95 |
| 5,719,341 | * 2/1998 | Reynolds et al. | 73/861.95 |

* cited by examiner

*Primary Examiner*—Harshad Patel
(74) *Attorney, Agent, or Firm*—Bacon & Thomas

(57) ABSTRACT

A thermal pulsed micro flow sensor includes thermal sensors positioned in a fluid channel at downstream positions relative to a heater. Flow rate is measured by determining the time that it takes a thermal pulse to pass between two of the sensors. Since the resolution of the measurement increases with increasing distance between sensors while the accuracy of the measurement decreases, there is a conflict between the requirements of accuracy and short response time, as well as between accuracy and resolution. By providing at least three sensors and by varying the distances between the sensors, however, it is possible to select a pair of sensors having the highest resolution required by the application in which the sensor is used, while still ensuring that the velocity measurement is within the range of velocities accurately measurable by the selected sensors. Furthermore, for sensors having predetermined overlapping velocity measurement ranges, by selecting the distance between two sensors based on a desired accuracy, and by including an adjustment factor, a desired resolution can likewise be achieved. As a result, the cross-sectional area of the channel can be made constant, and the micro flow sensing device can be can be used for different flow conditions without having to adjust the sensors, or to use sensors having different characteristics.

9 Claims, 7 Drawing Sheets

THERMAL PULSED MICRO FLOW SENSOR

FIELD OF THE INVENTION

The present invention pertains to a thermal pulsed micro flow sensor, especially to a thermal pulsed micro flow sensor comprising a plurality of thermal sensors.

BACKGROUND OF THE INVENTION

Along with the tremendous developments in the micromachining technology, the measurement of micro velocities has become an important technology. Among the measurement technologies, the "thermal pulsed micro flow sensor" is widely used in measuring the velocity of a flow in a microchannel.

A conventional thermal pulsed micro flow sensor measures the velocity of a flow according to the "flying time" of a thermal pulse from one point to another. During the measurement, a heater generates a thermal pulse and outputs it to a flowing fluid. While the fluid flows, the thermal pulse is carried by the fluid along a fluid channel. Two thermal sensors are used to sense the flying time of the thermal pulse between them. Since the velocity of the fluid is in inverse proportion to the flying time of the thermal pulse, the velocity may be easily measured from the flying time.

FIG. 1 illustrates the principal of velocity measurement used in a thermal pulsed micro flow sensor. As shown in this figure, a thermal pulse 101 is carried by a fluid flow F. The thermal pulse 101 travels through two thermal sensors and thus two thermal signals 102 and 106 are generated by the sensors separately. The time difference 103 of the two thermal signals 102 and 106 is counted based on a working frequency 104. Velocity of the fluid flow is calculated according to the following equation:

$$F = K*(A*L)/T = K*V/T \tag{1}$$

In this equation, F represents velocity of the fluid, K represents a calibration factor, A represents the cross sectional area of the microchannel, L represents the distance between the two thermal sensors, T represents time difference between the two thermal signals, i.e., the flying time of the thermal pulse, and V represents volume of the microchannel between the two thermal sensors.

The measurement of micro flows adopting thermal pulses has been disclosed by Harrington et al., in their U.S. Pat. No. 4,782,708 in 1988. In the Harrington invention, disclosed was a micro flow sensor with thermal pulses generated by a resistor driven by an oscillator current source. Two thermal couplers are used to generate respective thermal signals when a thermal pulse generated by the heater passes them, respectively. The time difference of the two thermal signals is measured so that the velocity of the flow may be known.

In 1993 Erskine et al. disclosed a micro flow sensor in their U.S. Pat. No. 5,243,858. In the Erskine invention, only one thermal sensor made of thermister is used. The flying time of the thermal pulse from the heater and the thermal sensor is measured. Velocity of the flow is calculated according to the flying time difference. In order to improve the accuracy in the measurement, two sets of flow sensors are arranged normally to each other. The two-dimensional flow rate of the microchannel is then taken for consideration.

In the above thermal pulsed micro flow sensors, measurements are based on the flying time of the thermal pulses. As a result, the ambient temperature won't affect the accuracy of the measurement. This approach is suited in cases where viscosity or thermal properties of the fluid varies from time to time, or where particles are carried in the fluid, such as in the blood.

In order to maintain the performance of a thermal pulsed micro flow sensor, the thermal pulse 101 shall have a certain level of amplitude and a sufficient width. This is because a pulse attenuates during the flow. In addition to this, variations in thermal conductivity or in flow will bring distortions into the pulse. These and other factors influences the accuracy of measurement of the micro flow.

FIG. 1a illustrates the relation between a thermal signal and the accuracy of measurement in a thermal pulsed micro flow sensor. In this figure, 105 represents width of a pulse 101 after being distorted. Accuracy in sensing the distortion and in picking-up the signals is limited to approximately the average width of the thermal pulses. In general case, the width is about 70–100 μs.

On the other hand, requirements for a measurement instrument include: broader measurable scale, high resolution and short response time. These requirements are in conflict with the said limitation of accuracy. Solutions to such conflict has then become a major task in the thermal pulsed micro flow sensor.

Take a mass flow controller adopting a thermal pulsed micro flow sensor as an example. FIG. 2 illustrates the structure of such a mass flow controller. As shown in this figure, a mass flow controller of this kind generally includes a fluid channel 205, a bypass microchannel 204, a flow sensor 201, a controller 203 and a microvalve 202. When a fluid is introduced into the fluid channel 205, a portion of the fluid enters microchannel 204. Flow sensor 201 measures the velocity of the fluid and outputs the velocity to controller 203. Controller 203 controls the velocity by adjusting microvalve 202 according to the velocity so measured.

In a mass flow controller as described above, requirements include accuracy of control to be 0.05% the full scale of the flow and response time to be under 0.5 sec. If full scale of the flow is 200 sccm, accuracy should be 0.1 sccm. While the "response time" shall include operation time consumed in the controller 203, the response time of the flow sensor should be under 0.25 sec.

FIG. 3 illustrates the relation between measured velocity and resolution in a thermal pulsed micro flow sensor with 600:1 bypass ratio. As shown in this figure, when the measurable scale of a flow sensor is expanded, its resolution will be decreased. If requirement in accuracy is 0.1 sccm, measurable scale of the flow sensor will be limited to under 23.3 sccm. It is possible to expand the measurable scale by expanding the sectional area of the microchannel. This, however, will lengthen the reaction time because of lower resolution, especially when flow speed is relatively low.

In order to solve the conflict, disclosed was an improved flow sensor in U.S. Pat. No. 5,533,412 (Jerman et al.) wherein the bypass channel has several sections, each section having different cross sectional area. Several thermal sensors are positioned in each section respectively. When the flow speed is higher, thermal sensors in a section with larger cross sectional area are used. And vice versa.

The flow sensor disclosed by Jerman et al. may be applied to a variety of velocities. It, however, has several drawbacks. First, due to the design of the multiple sections, the space required for a flow sensor will be expanded. The flow sensor so prepared will then be bulky and its manufacture cost is increased. As the cross sectional area of every section is different from that of others, sizes of heaters and thermal sensors shall be adjusted from section to section. This will bring difficulties in the manufacture process. Last but not least, since size of heaters and thermal sensors varies from section to section, special circuit is required to solve the difference in resistance in each section. Design of the flow sensor will thus become complex.

It is thus a need in the industry to have a simplified micro flow sensor that is applicable to a relatively larger scale of measurement. It is also a need to have a micro flow sensor with higher resolutions.

OBJECTIVES OF THE INVENTION

The purpose of this invention is to provide a novel thermal pulsed micro flow sensor with simplified structure.

Another purpose of this invention is to provide a thermal pulsed micro flow sensor that is applicable to relatively larger scale of measurement.

Another purpose of this invention is to provide a thermal pulsed micro flow sensor with higher resolutions.

SUMMARY OF THE INVENTION

According to the thermal pulsed micro flow sensor of this invention, a plurality of thermal sensors are used to measure the flying time of the thermal pulses. The thermal sensors are aligned along a microchannel with different distances from a first sensor. The microchannel has an identical cross sectional area in each section. A velocity is measured by selecting a thermal sensor that is suited for a measurable scope to which the velocity belongs. Method for selection of suited thermal sensor is disclosed.

These and other objectives and advantages of this invention will be clearly understood from the detailed description by referring to the following drawings.

IN THE DRAWINGS

DETAILED DESCRIPTION OF THE INVENTION

Figure 1:
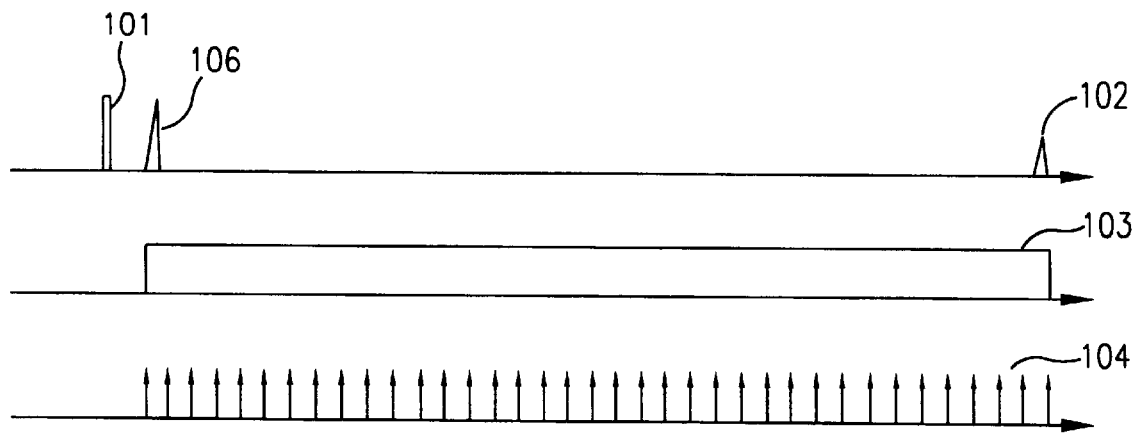
FIG. 1 illustrates the principle of velocity measurement used in a thermal pulsed micro flow sensor.
Figure 1A:
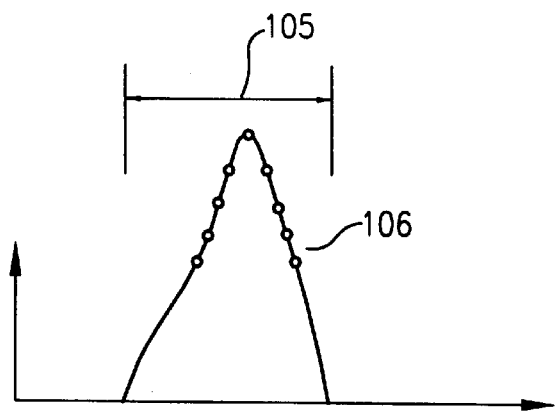
FIG. 1a illustrates the relation between a thermal signal and the accuracy in measurement in a thermal pulsed micro flow sensor.
Figure 2:
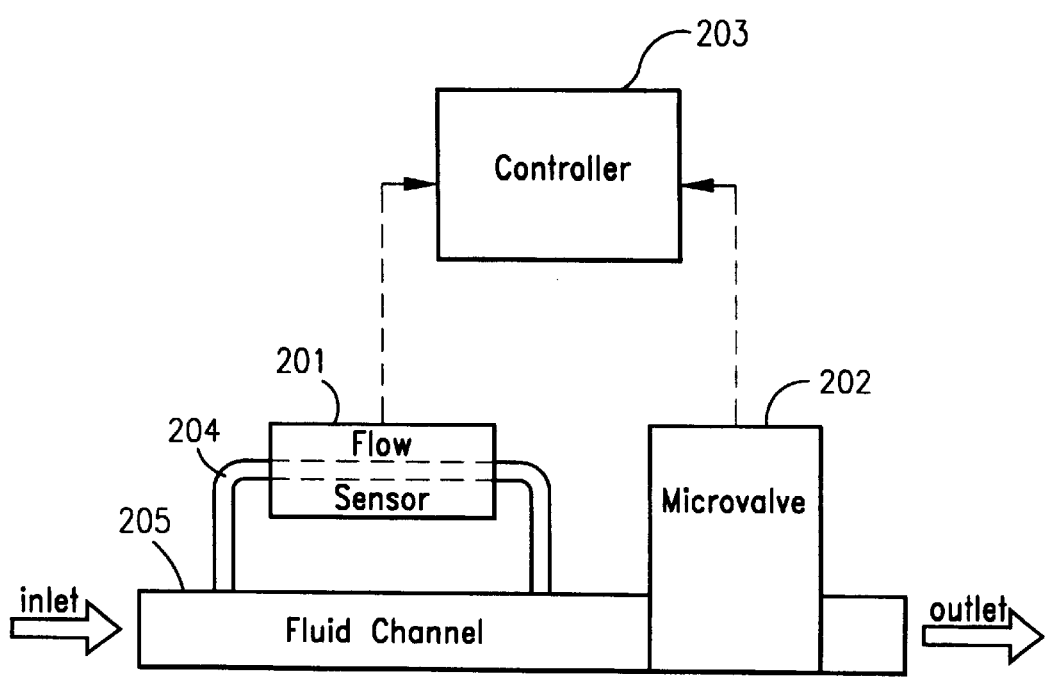
FIG. 2 illustrates the structure of a mass flow controller adopting a thermal pulsed micro flow sensor.
Figure 3:
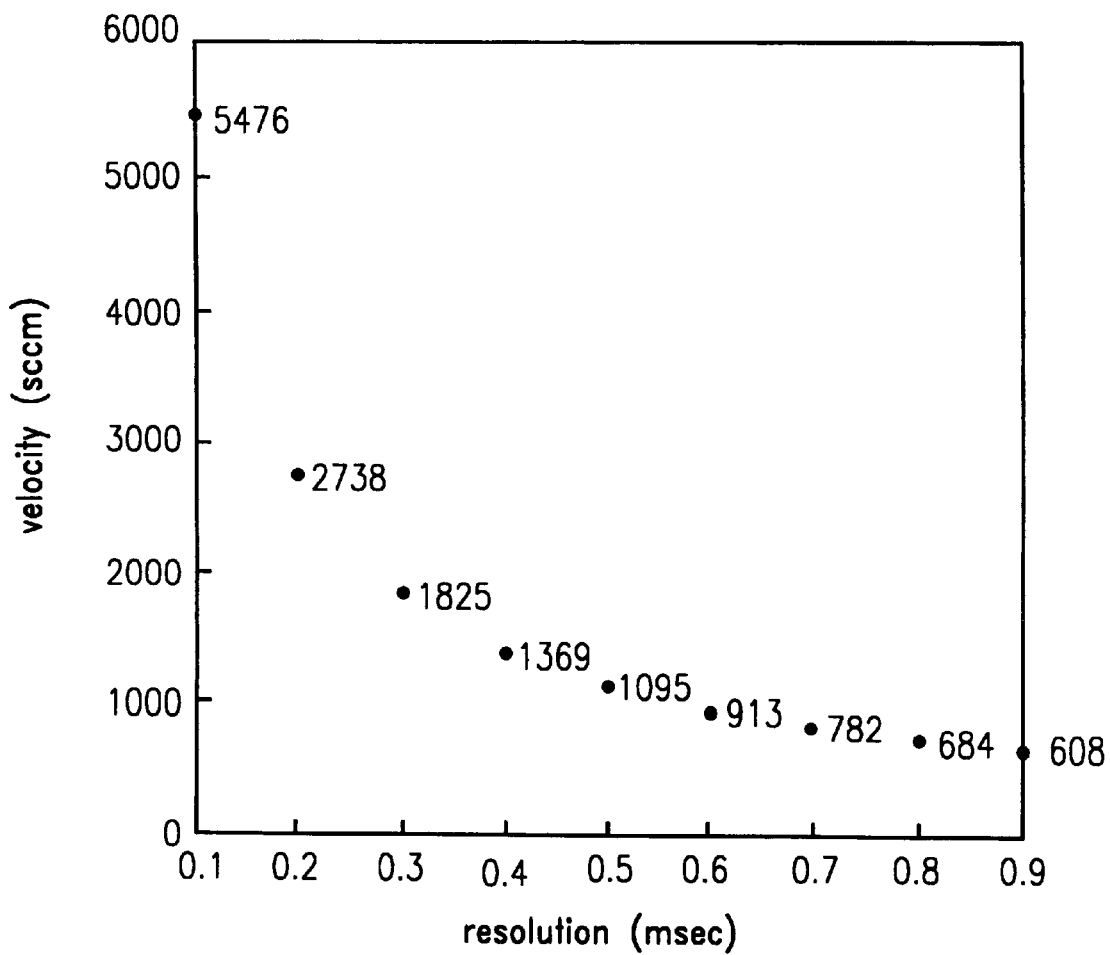
FIG. 3 illustrates the relation between measured velocity and resolution in a thermal pulsed micro flow sensor with 600:1 bypass ratio.
Figure 4:
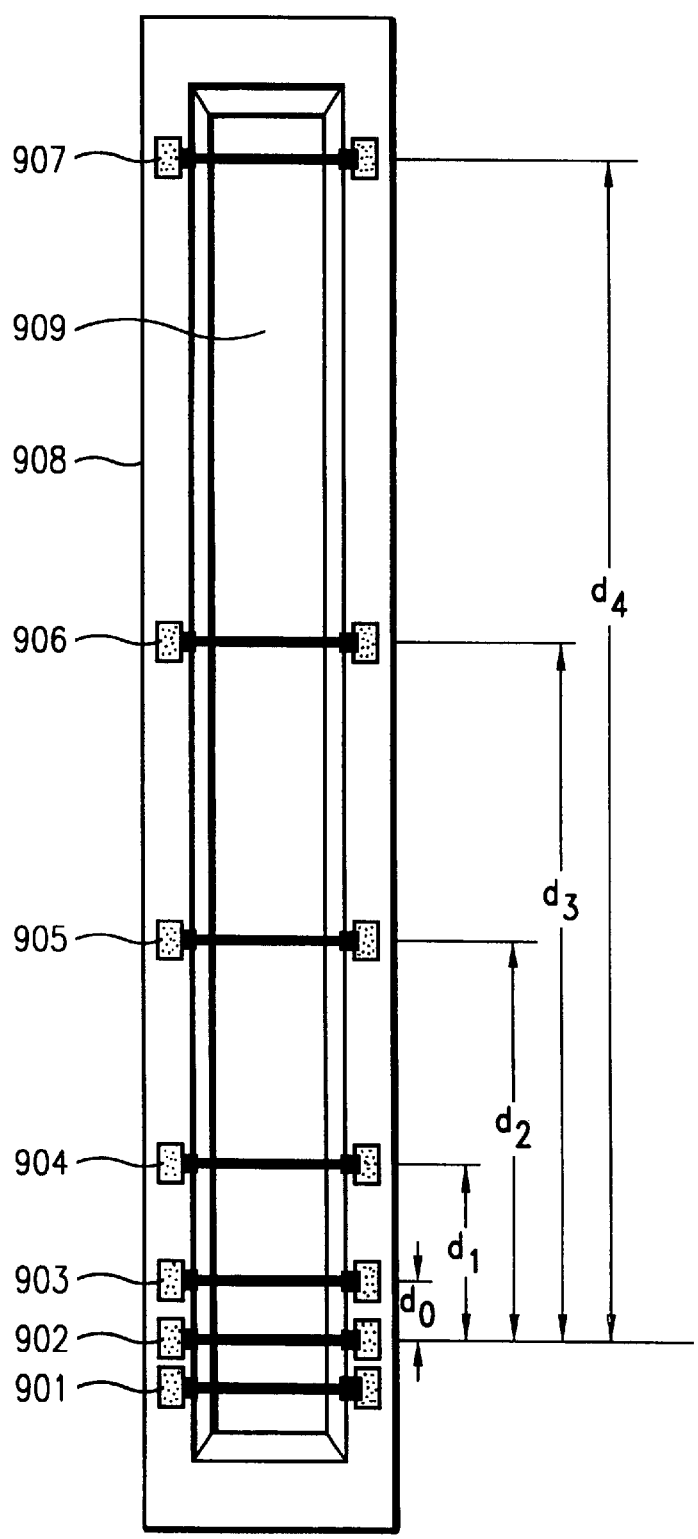
FIG. 4 illustrates the plan view of an embodiment of the thermal pulsed micro flow sensor prepared according to the method of the invention.

The following is a detailed description of the embodiments of the thermal pulsed micro flow sensor of this invention. Refer to FIG. 4. FIG. 4 illustrates the plan view of an embodiment of the thermal pulsed micro flow sensor of the invention.

As shown in this figure, the thermal pulsed micro flow sensor of this invention includes: a substrate 908, a microchannel 909 positioned in said substrate 908, and a heater 901 and 6 thermal sensors 902, 903, 904, 905, 906 and 907, all positioned in said microchannel 909. Material of the substrate 908 may be metal, resin or other polymer, or semiconductor. In this embodiment, the substrate 908 is a silicon wafer or a silicon dice such that the flow sensor may be integrated and prepared with the semiconductor manufacture process. The microchannel 909 may be prepared by etching the substrate 908 or injecting or pressing a substrate material with a mold. Material for the heater 901 may be platinum or other heat generating material. If platinum is applied, heater 901 may be prepared with the semiconductor manufacture technology. Suited material for the thermal sensors 902–907 includes platinum, polysilicon, nickel and other materials that are suited in the semiconductor manufacture technology.

During the measurement, a thermal pulse is generated by the heater 901. The thermal pulse is carried along microchannel 909, by a fluid flow F inside the microchannel 909. Each of thermal sensors 902–907 generates a thermal signal, when the thermal pulse reaches it, since its resistance changes due to change of its temperature caused by the thermal pulse.

Figure 5:
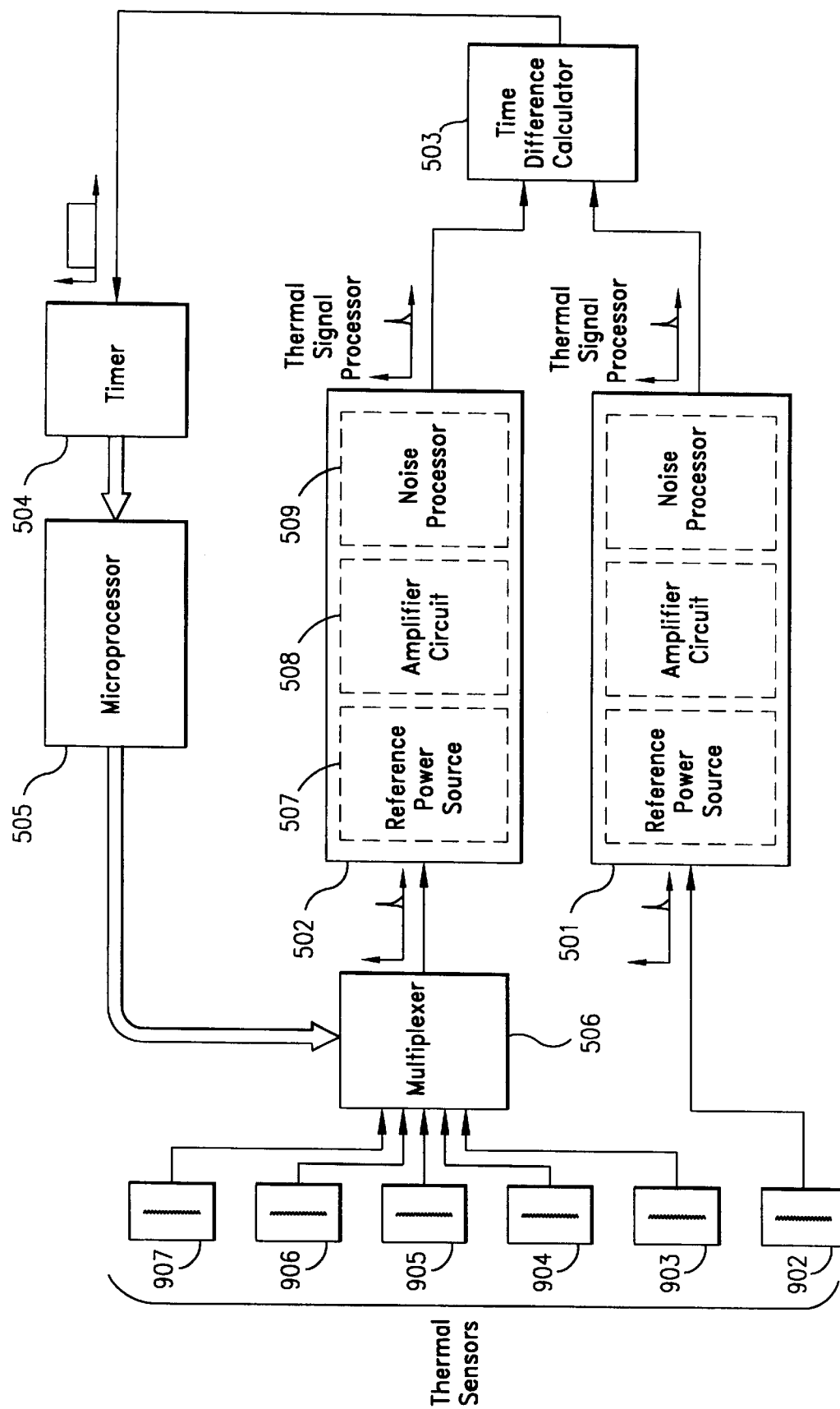
FIG. 5 illustrates the circuit diagram of a signal processing circuit suited in the thermal pulsed micro flow sensor of FIG. 4.

FIG. 5 illustrates the circuit diagram of a signal processing circuit suited in the thermal pulsed micro flow sensor of FIG. 4. As shown in this figure, the signal processing circuit includes: a heater 901, a plurality of thermal sensors 902, 903, 904, 905. 906 and 907, a multiplexer 506, thermal signal processors 501 and 502, a flying time calculator 503, a timer 504, and a microprocessor 505.

When heater 901 generates a thermal pulse, the pulse is sensed first by thermal sensor 902 and thermal sensor 902 generates a thermal signal to thermal signal processor 501. Multiplexer 506 selects a thermal sensor (e.g., 907) from among thermal sensors 903–907 so that when the thermal pulse reaches the selected thermal sensor 907, a thermal signal is generated by the thermal sensor 907 and output to thermal signal processor 502. The flying time between thermal sensors 902 and 907 may be measured by flying time calculator 503 according to thermal signals processed by thermal signal processors 501 and 502. As the cross sectional area of the microchannel 909 and the distance between thermal sensors 902 and 907 are already known, the velocity of the fluid flow may be calculated according to the above equation (1).

In the circuit as described above, each of thermal signal processors 501 and 502 may include a reference power source 507 to provide a constant current so that when the resistance of a thermal sensor is changed, a corresponding change of voltage may be generated; an amplifier circuit 508 to convert changes of voltage into signals; and a noise processor 509 to improve the S/N ratio of the signal. Time difference calculator 503 includes two D-type flip-flops, to convert time difference between signals generated by thermal signal processor 501 and by 502 into flying time signals. The flying time signals may be standard TTL signals so that they may be processed by timer 504. Length of the flying time signal may be substantially equal to the time difference between signals generated by thermal signal processors 501 and 502. Timer 504 measures length of a flying time signal generated by flying time processor 503 and convert it into a digital format. The flying time in digital format is processed by microprocessor 505. Timer 504 may be a timer integrated in microprocessor 505 or a stand-along timer, e.g., an 8254 timer. Microprocessor 505 calculates velocity of the fluid flow according to the flying time. Microprocessor 505 is also capable of selecting a suited thermal sensor from among thermal sensors 903–907 through multiplexer 506.

Distances between thermal sensors 903, 904, 905, 906 and 907 and thermal sensor 902 $d_1$, $d_2$, $d_3$, $d_4$ and $d_5$ (referring to FIG. 4), may be decided according to the measurable scopes of the thermal sensors.

In order to describe the thermal pulsed micro flow sensor of this invention, a thermal pulsed micro flow sensor with the following conditions will be taken for example. Suppose the cross sectional area of the microchannel 909 is $1.15*10^{-7}$ m² and tolerance for the thermal signals is 100 μs. Requirements of a flow sensor are:

Full scale of measurement: 200 sccm.

Accuracy of measurement: 0.05% the full scale, 0.1 sccm.

Response time: 0.25 sec.

Bypass ratio: 600:1.

Under these conditions, the positions of the thermal sensors 903–907 may be decided as follows:

Let $L_1$ represent the distance between the most upstream thermal sensor 902 and the most down stream thermal sensor 907. Value of $L_1$ may be decided by the full scale and the tolerance of the thermal pulse, as follows:

$$\Delta F=(A*L_n)*\{1/T_n-1/(T_n+\Delta T)\}; \quad (2)$$

wherein ΔF represents accuracy in velocity measurement (0.1 sccm); A represents cross sectional area of the fluid channel ($1.15*10^{-7}$ m²); $T_n$ is flying time and $T_n=(A*L_n)/F$ wherein F represents full scale of measurable velocity of thermal sensor 907 (200 sccm) and n represents number of thermal sensor counting from the most downstream one; and ΔT represents tolerance of the thermal pulse signals (100 μs).

Figure 6:
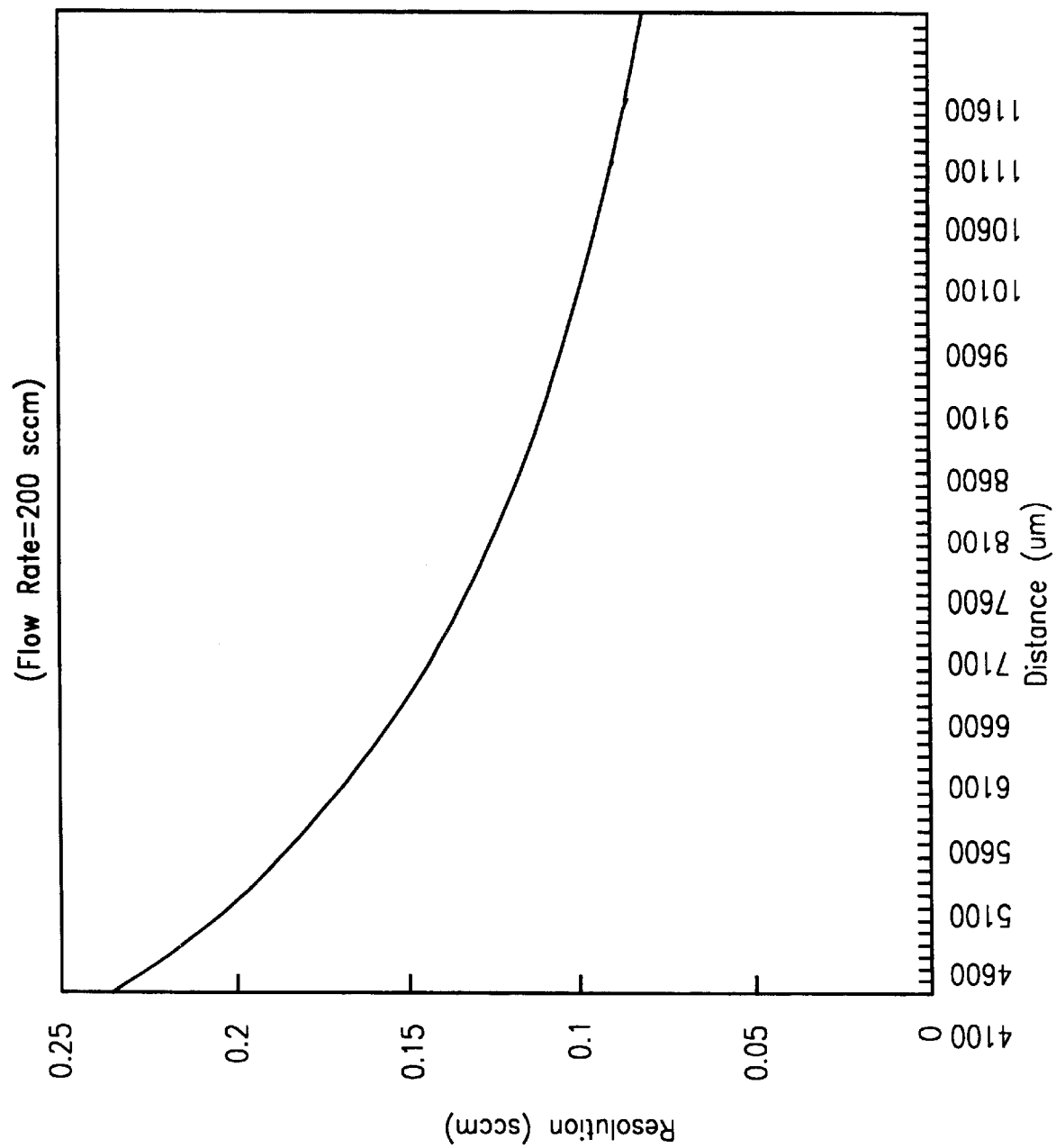
FIG. 6 illustrates the relation between distances of thermal sensors and resolutions of measurements, under the velocity of 200 sccm.

FIG. 6 illustrates the relation between distances of thermal sensors and resolutions of measurements, under the velocity of 200 sccm. As shown in this figure, the longer the distance between two thermal sensors is, the higher the resolution of measurement will be. In order to enhance the resolution of measurement, the shortest distance within a required resolution is chosen. Here, the value is 9680 μm. This value represents the distance between the most upstream thermal sensor 902 and the most downstream thermal sensor 907.

The measurable scope of thermal sensor 907 is then calculated. Since the required maximum response time is 0.25 sec, the minimum applicable velocity of thermal 907 may be decided as follows:

$$F'_1=(A*L_1)/R; \quad (3)$$

wherein R represents the required maximum response time, 0.25 sec.

We then have: $F'_1$=160.3 sccm.

Later, position for a second thermal sensor 906 that is applicable to a slower scale of velocity, is determined. Suppose the distance between thermal sensors 902 and 906 is $L_2$. $L_2$ may be determined according to equation (2) by replacing full scale F with minimum measurable scope of the first sensor, $F'_1$.

In some embodiments of this invention, the full scale of a thermal sensor is replaced by the minimum measurable scope of a formerly determined sensor, plus an adjustment factor, such that measurable scopes of thermal sensors $S_n$ and $S_{n-1}$ are overlapping, as follows:

$$F_n=(A*L_{n-1})/R+\alpha_n \quad (4)$$

Wherein $\alpha_n$ represents an adjustment factor.

We then have the distance between thermal sensors 902 and 906 to be 6220 μm.

Distances between thermal sensor 902 and other thermal sensors 903–905 are calculated in a similar way. We then have:

Distance between thermal sensors 902 and 907: 9680 μm, to measure the scope from 200.0–160.3 sccm.

Distance between thermal sensors 902 and 906: 6220 μm, to measure the scope from 160.2–103.0 sccm.

Distance between thermal sensors 902 and 905: 2580 μm, to measure the scope from 103.0–42.7 sccm.

Distance between thermal sensors 902 and 904: 460 μm, to measure the scope from 42.7–7.6 sccm.

Distance between thermal sensors 902 and 903: 20 μm, to measure the scope under 7.6 sccm.

Figure 7:
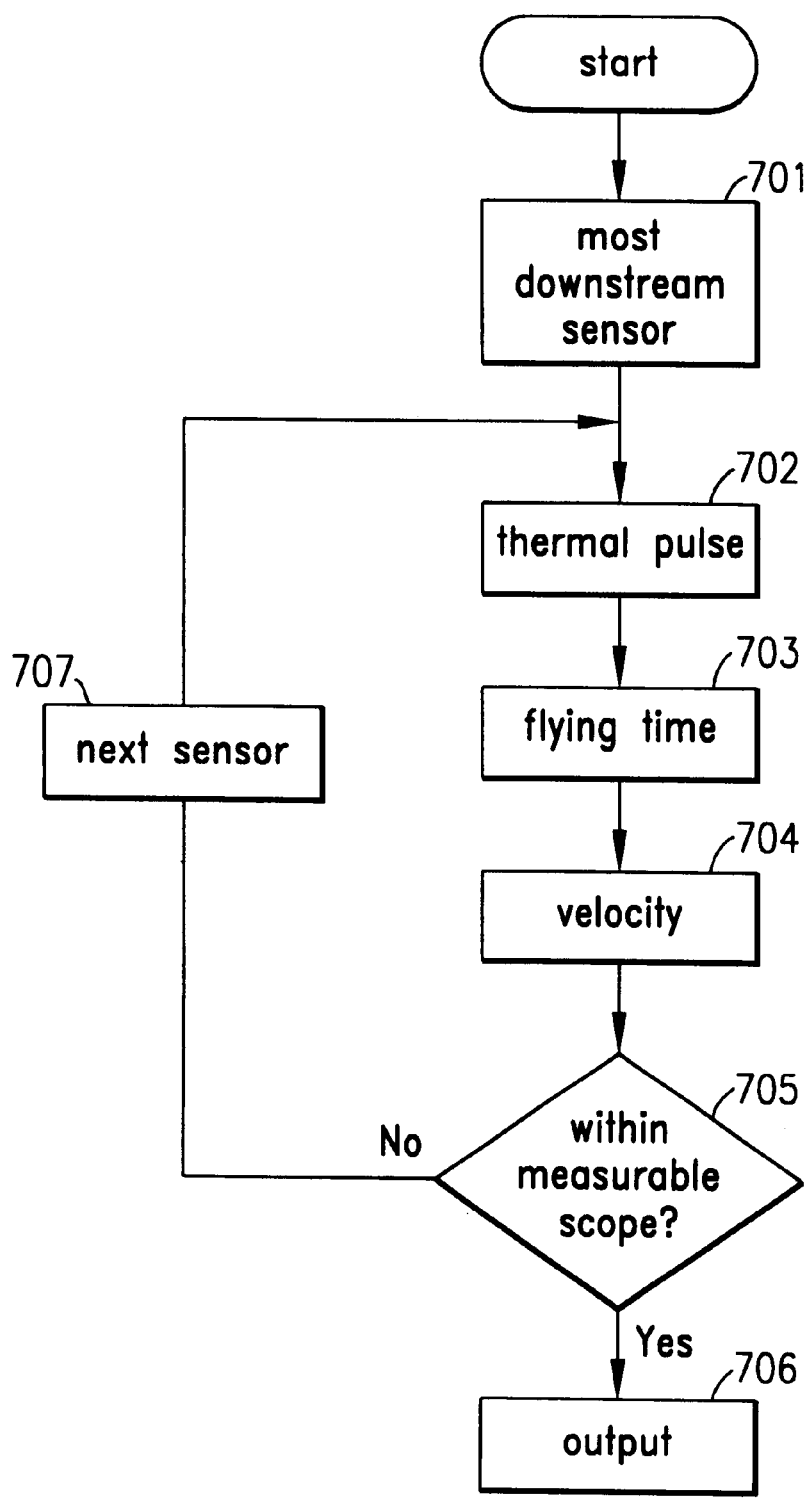
FIG. 7 illustrates the flow chart of signal processing of one embodiment of the thermal pulsed micro flow sensor of this invention.

FIG. 7 illustrates the flow chart of signal processing of one embodiment of the thermal pulsed micro flow sensor of this invention. As shown in this figure, in the measurement of a velocity, at 701 the most downstream thermal sensor 907 is selected. At 702, heater 901 generates a thermal pulse. At 703 the flying time of the thermal pulse between thermal sensors 902 and 907 is measured. At 704 velocity of the flow is calculated according to the above equation (1). At 705, the velocity is compared with the measurable scope of thermal sensor 907 to determine whether it is within the measurable scope. If the determination is positive, the velocity value is output at 706; Otherwise, the second thermal sensor 906 next to thermal sensor 907 is selected at 707 and steps from 702 to 706 are repeated until the determination if positive.

EFFECTS OF THE INVENTION

As described above, the micro flow sensor of this invention is applicable to a variety of measurable scopes, while the sectional area of the microchannel remains unchanged in all sections. The space needed by the device is thus reduced, in comparison with that of the Jerman invention. In the micro flow sensor of this invention, thermal sensors are of the same size. Preparation of the device may be simplified. Since a thermal signal processor is shared by all thermal sensors, circuit design and processing of the circuit is again simplified. As the positions of the thermal sensors may be determined according to the actual conditions in the measurement, an ideal design of the flow sensor may be made to comply with all requirements in the measurement.

Of course, the present invention is applicable when flying time of a thermal pulse from the heater to a selected thermal sensor is used to calculate the fluid velocity. Necessary modifications may be made by those skilled in the art. Detailed description thereof is thus omitted.

As the present invention has been shown and described with reference to preferred embodiments thereof, those skilled in the art will recognize that the above and other changes may be made therein without departing from the spirit and scope of the invention.

What is claimed is:

1. A thermal pulsed micro flow sensing device includes a plurality of thermal sensors positioned in a fluid channel at downstream positions relative to a heater, and a circuitry connected to the sensors for measuring flow rate by determining a time that a thermal pulse takes to pass between two of the sensors, wherein:

the plurality of sensors includes at least a first thermal sensor, a second thermal sensor, and a third thermal sensor, said first, second, and third thermal sensors are positioned at different distances from each other, and said sensing device is arranged to select two of the first, second, and third sensors having a highest resolution required by the application in which the sensing device is used, while still ensuring that the velocity measurement is within a range of velocities accurately measurable by the selected two sensors.

2. A thermal pulsed microflow sensing device as recited in claim 1, wherein said fluid channel has a constant cross-sectional area.

3. A thermal pulsed microflow sensing device as recited in claim 1, wherein a distance ($L_n$) between a most upstream thermal sensor and an $n^{th}$ downstream thermal sensor is:

$$\Delta F=(A^*L_n)^*\{1/T_n-1/(T_n+\Delta T)\}$$

wherein $\Delta F$ represents an accuracy in velocity measurement; A represents a cross-sectional area of the fluid channel; $T_n$ is said time that it takes the thermal pulse to pass between said most upstream thermal sensor and said downstream thermal sensor; and $T_n=(A^*L_n)/F$, and wherein $F_n$ represents a full scale of measurable velocities for the $n^{th}$ downstream thermal sensor and n represents a number of thermal sensors counting from the most downstream thermal sensor;

wherein $\Delta T$ represents a tolerance of the thermal pulse signals; and wherein $F_n=(A^*L_n)/R+\Delta_n$ for every n, n>1, where R represents a required response time and $\alpha_n$ represents an adjustment factor.

4. A thermal pulsed micro flow sensing device includes a plurality of thermal sensors positioned in a fluid channel at downstream positions relative to a heater, and a circuitry connected to the sensors for measuring flow rate of a fluid by determining a time that a thermal pulse takes to pass between two of the sensors, wherein:

the plurality of sensors includes at least a first thermal sensor and a second thermal sensor, said first and second thermal sensors have predetermined overlapping velocity measurement ranges, the distance between the first and second sensors is selected based on a desired accuracy, and said sensing device is arranged to include an adjustment factor when calculating a velocity of said fluid, said adjustment factor ensuring that the velocity measurement is within a range of velocities accurately measurable by said first and second sensors.

5. A thermal pulsed microflow sensing device as recited in claim 4, wherein said fluid channel has a constant cross-sectional area.

6. A thermal pulsed microflow sensing device as recited in claim 4, wherein a distance ($L_n$) between a most upstream thermal sensor and an $n^{th}$ downstream thermal sensor is:

$$\Delta F=(A^*L_n)^*\{1/T_n-1/(T_n+\Delta T)\}$$

wherein $\Delta F$ represents an accuracy in velocity measurement; A represents a cross-sectional area of the fluid channel; $T_n$ is said time that it takes the thermal pulse to pass between said most upstream thermal sensor and said downstream thermal sensor; and $T_n=(A^*L_n)/F$, and wherein $F_n$ represents a full scale of measurable velocities for the $n^{th}$ downstream thermal sensor and n represents a number of thermal sensors counting from the most downstream thermal sensor;

wherein $\Delta T$ represents a tolerance of the thermal pulse signals; and wherein $F_n=(A^*L_n)/R+\alpha_n$ for every n, n>1, where R represents a required response time and $\alpha_n$ represents said adjustment factor.

7. A method of measuring flow rate in a thermal pulsed micro flow sensing device that includes at least three thermal sensors including a most upstream thermal sensor and at least two downstream thermal sensors positioned in a fluid channel at downstream positions relative to a heater, comprising the steps of:

causing said heater to generate a thermal pulse to be carried away by fluid in said fluid channel;

actuating the most upstream thermal sensor $S_0$ and one of the two downstream thermal sensors $S_n$;

causing said most upstream thermal sensor $S_0$ to generate a first thermal signal upon sensing said thermal pulse;

causing said downstream thermal sensor $S_n$ to generate a second thermal signal upon sensing said thermal pulse;

measuring a time difference $T_n$ between said first and said second thermal signals;

calculating a velocity of said fluid F according to the following equation:

$$F=(A^*L_n)/T_n,$$

where A represents a cross-sectional area of said channel and $L_n$ represents a distance between thermal sensors $S_0$ and $S_n$;

determining a minimum measurable velocity for said thermal sensor $S_n$, $F'_n$, according to the following equation:

$$F'_n=(A^*L_n)/R,$$

where R represents a required response time;

causing said controller to output said velocity F if F is greater than $F'_n$; and causing said controller to actuate a thermal sensor next to said thermal sensor Sn and repeat the above steps until F is greater than F'n.

8. A thermal pulsed microflow sensing device as recited in claim 7, wherein said fluid channel has a constant cross-sectional area.

9. A thermal pulsed microflow sensing device as recited in claim 7, wherein a distance ($L_n$) between a most upstream thermal sensor and an $n^{th}$ downstream thermal sensor is:

$$\Delta F=(A^*L_n)^*\{1/T_n-1/(T_n+\Delta T)\}$$

wherein $\Delta F$ represents an accuracy in velocity measurement; A represents a cross-sectional area of the fluid channel; $T_n$ is said time that it takes the thermal pulse to pass between said most upstream thermal sensor and said downstream thermal sensor; and $T_n=(A^*L_n)/F$, and wherein $F_n$ represents a full scale of measurable velocities for the $n^{th}$ downstream thermal sensor and n represents a number of thermal sensors counting from the most downstream thermal sensor;

wherein $\Delta T$ represents a tolerance of the thermal pulse signals; and wherein $F_n=(A^*L_n)/R+\alpha_n$ for every n, n>1, where $\alpha_n$ represents an adjustment factor.

* * * * *